United States Patent

[11] 3,590,720

| [72] | Inventor | Burton L. Siegal |
| | | Skokie, Ill. |
| [21] | Appl. No. | 822,528 |
| [22] | Filed | May 7, 1969 |
| [45] | Patented | July 6, 1971 |
| [73] | Assignee | Leslie Welding Co. Inc. |
| | | Franklin Park, Ill. |

[54] TURBINE VENTILATOR ASSEMBLY
8 Claims, 1 Drawing Fig.

[52] U.S. Cl. ............................................. 98/75,
308/230
[51] Int. Cl. ............................................. F24f 7/02
[50] Field of Search............................................. 98/75;
308/230, 233

[56] References Cited
UNITED STATES PATENTS

| 1,977,934 | 10/1934 | Bolton | 98/75 |
| 2,544,166 | 3/1951 | Limberger | 308/230 |
| 3,311,433 | 3/1967 | Graham et al. | 308/230 |
| 3,392,659 | 7/1968 | Rousey | 98/75 X |
| 3,430,550 | 3/1969 | Smith et al. | 98/75 X |

| 856,245 | 6/1907 | Gamon | 308/M (UX) |

*Primary Examiner*—William E. Wayner
*Attorney*—Olson, Trexler, Wolters and Bushnell ABSTRACT: A turbine ventilator of the type designed to be affixed to ventilator or exhaust stacks. Said ventilator comprises a turbine head, and support means mounting said head for rotative movement relative thereto. The journaling of said turbine head to the support means is provided by upper and lower bearing arrangements. At least one said bearing arrangement comprises an elastomeric seat member having a socket formed therein, a ceramiclike spherical bearing element positioned in said socket to provide a convex bearing surface, and a cooperating bearing element having a spherical recess which receives said ceramiclike bearing element and provides a corresponding concave bearing surface, said cooperating bearing element being constructed of a low friction plasticlike resinous material. In addition, the radius of curvature of each said bearing surface may be formed such that point contact results, with said point of contact orbiting during operation of the ventilator to provide a cleaning action for the bearing surfaces.

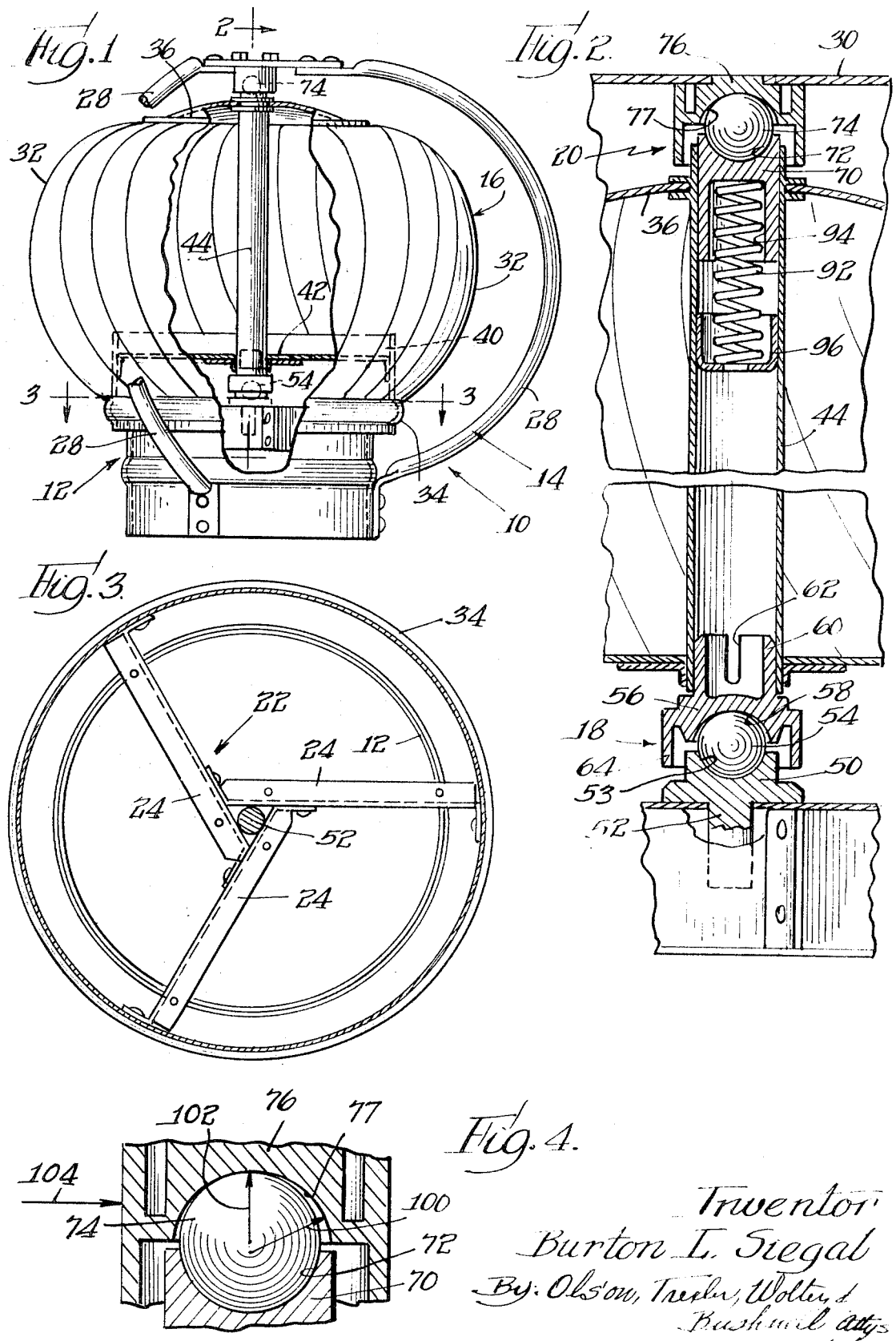

TURBINE VENTILATOR ASSEMBLY

BACKGROUND OF THE INVENTION

The present invention relates to a turbine or rotary ventilator. More specifically, said invention pertains to a turbine ventilator construction employing a novel bearing arrangement.

Rotary or turbine ventilators of the general type to which the present invention is directed are normally employed on ventilators or smokestacks, and thus are often at a considerable height and/or in locations not easily accessible to maintenance personnel. Accordingly, from a practical standpoint, these ventilators are constructed in a manner such that little or no lubrication or preventative maintenance is required to keep them in working order, yet these ventilators must be capable of extended, dependable operation.

Accordingly, it is an object of the present invention to provide a turbine ventilator constructed to attain and assure freedom of rotative movement after considerable use and exposure to the elements.

Another important object of the present invention is the provision of a turbine ventilator employing a novel bearing assembly that is easily and economically constructed and assembled.

A further object of the present invention is the provision of a turbine ventilator employing a novel bearing arrangement that is self-cleaning during use to assure relatively long, trouble free operation.

Still another object of the present invention is the provision of a turbine ventilator construction that is adapted to withstand winds of considerable velocity without the danger of failure due to disassembly of the bearing construction.

Other objects, features and advantages of the present invention will become apparent to those skilled in the art as the detailed description of the illustrated embodiment is evolved hereinafter.

DESCRIPTION OF THE DRAWINGS

FIG. 1 is a partial elevational view of a turbine ventilator of the type to which the present invention is directed, with a portion of the turbine assembly and the base member broken away.

FIG. 2 is an enlarged fragmentary, partially sectional view taken along the lines 2-2 in FIG. 1, in the direction indicated.

FIG. 3 is a sectional view taken along the line 3-3 of FIG. 1, in the direction indicated.

FIG. 4 is an enlarged, fragmentary sectional view of the bearing arrangement employed with the present invention.

DESCRIPTION OF THE ILLUSTRATED EMBODIMENT

Referring now more specifically to the drawings, wherein like parts are designated by the same numerals throughout the various figures, a turbine unit, designated generally 10, incorporating the features of the present invention is shown in FIG. 1. The unit 10 includes a base member 12, an external brace or frame assembly 14, a vaned head or turbine element 16 mounted for rotative movement relative to the base 12 and brace assembly 14. This rotative movement is provided by the lower and upper bearing arrangements, designated generally 18 and 20, respectively. As will be detailed more fully hereinafter, a portion of the lower bearing 18 is provided by the base member 12, while a portion of bearing assembly 20 is provided by the brace assembly 14.

The base member 12 is of generally cylindrical construction, and is adapted to be connected to a ventilator or smokepipe (not shown). As is illustrated in FIG. 3, the base member 12 includes a spider arrangement designated generally 22 which provides supporting means for a component of the lower bearing arrangement 18. In the illustrated embodiment spider 22 includes three C-shaped braces 24 which are assembled to provide a triangular opening, as indicated at 26. This triangular space or opening provides means for reception of a portion of the lower bearing element 18, as will be discussed more fully hereinafter.

The frame or brace assembly 14 is affixed to the base 12 and extends upwardly thereof in surrounding relation to the turbine or head member 16. Said frame assembly 14 includes a plurality of strut members 28 which are affixed to and circumferentially spaced about base member 12 at the lower ends thereof, and affixed to a mounting plate 30 superposed with respect to said turbine head 16. The mounting plate member 30, similar to spider assembly 22, carries a portion of the associated bearing arrangement, in this instance bearing arrangement 20.

Concerning now the turbine head portions 16, attention again is invited to FIG. 1. The turbine head 16 includes a plurality of circumferentially spaced vane or turbine blade members 32. Said blade members 32 are attached at their lower ends to a sleeve element 34, and at their upper ends to a dome-shaped cap member 36. The manner of effecting said assembly of the vane members to the sleeve 34 and the dome-shaped cap element 36 is a matter of choice and not critical to the present invention, riveting, welding, or the like being anticipated.

The sleeve element 34 includes a plurality of inwardly extending radial arms 40 affixed to the inner periphery thereof and attached to a central disc member 42. Axially disposed of the turbine head 16 and constituting a portion thereof is the bearing shaft 44 which is mounted at its lower end to the disc 42 and at its upper end to the dome-shaped cap member 36.

The bearing shaft 44 carries a portion of the lower bearing assembly 18, as well as a portion of the upper bearing assembly 20, both of which are illustrated in detail in FIG. 2, to which attention is now directed.

The lower bearing assembly 18 includes an elastomeric seat 50 which has a cylindrical extension 52 that is disposed in the aforediscussed triangular space 26 provided by the braces 24, whereby said seat 50 is carried by the spider arrangement 22 of base member 12. The elastomeric seat 50 has a central depression or recess 53 within which is disposed a ceramiclike bearing member 54. Said bearing member 54, as illustrated, is of a spherical configuration, however, insofar as the present invention is concerned it is only necessary that said bearing member present a spherical surface for engagement by the cooperating bearing surface carried by the bearing shaft 44.

In this regard, the bearing shaft 44 carries a cup-shaped bearing member 56 constructed of a low friction plasticlike material such as Teflon or the like. Bearing member 56 has a concave, spherically shaped cavity 58 within which is received the spherical surface of the bearing member 54.

Since the seat 50 is constructed of an elastomeric material, the coefficient of friction between said seat and the spherical bearing element 54 disposed in recess 53 is high to prevent relative movement. Accordingly, upon rotation of the turbine head 16 relative movement will occur primarily between the cuplike bearing member 56 and the ceramiclike bearing element 54.

The cuplike bearing element 56 includes a tubular extension 60 which is received within an open end of the bearing shaft 44. The tubular extension 60 is provided with one or more longitudinal slits 62 to afford a degree of resiliency and permit the element 56 to be frictionally engaged within the open end of said shaft 44. Also, the cuplike bearing element 56 has a downwardly depending skirt portion 64 which encircles and shields the recess 58 and the bearing member 54. Thus, in the assembled condition, as shown in FIG. 2, it can be seen that the skirt portion 64 will prevent moisture, dust particles, or the like from being deposited on the bearing surfaces.

Turning now to the upper bearing assembly 20, which is illustrated in the upper half of FIG. 2, it can be seen that same is of a somewhat similar construction to the lower assembly 18. However, in arrangement 20 the elastomeric seat and the ceramiclike spherical bearing element are carried by the bearing shaft 44, while the cuplike bearing element of low friction plastic material is carried by the plate 30 of the external brace assembly 14.

More specifically, the upper, open end of bearing shaft 44 has an elastomeric seat member 70 slidably disposed therein. The seat 70 includes a concave socket or recess 72 within which is disposed a spherical ceramiclike bearing element 74, similar to the aforementioned bearing element 54. A cuplike bearing element 76 constructed of a low friction plastic material is carried by the plate member 30 of the brace assembly 14, and includes a concave recess 77 which corresponds in shape to and receives the spherical portion of bearing element 74 extending upwardly from seat 70.

Similar to the lower bearing element 56 previously discussed, bearing element 76 of the upper bearing 20 includes a downwardly depending skirt portion 78 which shields the bearing surfaces and prevents the ingress of moisture, dirt particles, or the like.

In addition, it should be noted that the elastomeric seat member 70 is slidably and spring-biasedly mounted in the upper, open end of bearing shaft 44. This mounting is achieved by means of a spring 92 which is received within a socket 94 formed in the lower portion of seat 70 and engaged against a retainer member 96 which is fixedly secured to the inner periphery of bearing shaft 44. Accordingly, with the slidable, spring-biased mounting of the seat 70, assembly of the various elements of the ventilator unit is facilitated. Also, the resilient mounting of seat 70 assures that the elements of the respective bearing assemblies, 18 and 20, will be in relatively tight engagement to preclude bothersome noise resulting from clearance during operation of the ventilator 10.

FIG. 4 is an enlarged representation of the construction of seat 70 and bearing elements 74 and 76 of the upper bearing assembly 20. But, it should be kept in mind that the hereinafter discussed relationships between the spherical bearing surfaces applies equally to the lower bearing element 18. More specifically, the concave recess 77 is formed such that its radius of curvature 100 is slightly greater than the radius of curvature 102 of the spherical surface of bearing element 74, such that surface to surface contact does not result, the type of contact resulting being more or less point contact. On the other hand, the lower portion of spherical bearing element 74 is closely received in the concave recess 72 of the elastomeric seat 70, such that relative movement therebetween is precluded. Accordingly, if a horizontal load is placed on the entire assembly during rotation, as indicated by arrow 104, the point of contact between the respective spherical surfaces will orbit with respect thereto. Thus, not only is the wear distributed over a relatively large zone, but this orbiting of the point of contact creates a self-cleaning action for the spherical surfaces. This self-cleaning action keeps the bearing free from harmful deposits and assures a lengthy, trouble free life for the ventilator 10.

While a preferred embodiment of the present invention has been illustrated and described, it is obvious that many structural changes and modifications may be practiced without departing from the spirit and scope of the invention as defined by the claims appended hereto.

What I claimed and desired to be secured by United States Letters Patent is:

1. A turbine ventilator comprising: a turbine head; and support means mounting said head for rotative movement, said support means including upper and lower bearing arrangements, at least one said arrangement comprising an elastomeric seat member having a socket formed therein, a ceramiclike bearing element positioned in said socket and presenting a spherically convex bearing surface, the coefficient of friction between said seat member and the ceramiclike bearing element being high to prevent relative movement, and a cooperating bearing element engaging said ceramiclike bearing element, said cooperating bearing element being constructed of a low friction, plasticlike material and having a spherically concave bearing surface cooperatively engaging the convex surface of said ceramiclike bearing element.

2. A turbine ventilator as defined in claim 1 wherein both the upper and lower bearing arrangements include an elastomeric seat member, a ceramiclike bearing element and a cooperating bearing element constructed of a low friction, plasticlike material.

3. A turbine ventilator as defined in claim 2 wherein said turbine head includes an axial shaft, the lower portion of said shaft carrying said plasticlike bearing element of the lower bearing arrangement, and the upper portion of said shaft carrying the elastomeric seat and ceramiclike bearing member of the upper bearing arrangement, such that both spherically concave bearing surfaces face downwardly thereby to reduce the possibility of contaminants fouling said bearing arrangements.

4. A turbine ventilator as defined in claim 3 wherein the plasticlike bearing element of each bearing arrangement includes an annular, downwardly depending skirt portion which substantially prevents moisture, dust, or the like, from being deposited on the respective bearing surfaces.

5. A turbine ventilator as defined in claim 2, said supporting means including a base member adapted to be affixed to a stack or the like, and an external frame fixedly secured to said base member in surrounding relationship to said turbine head, which turbine head is adapted to rotate relative to said frame and said base member, said base member carrying the elastomeric member and the ceramiclike bearing element of the lower bearing arrangement, and said frame carrying the plasticlike bearing member of the upper bearing arrangement.

6. A turbine ventilator as defined in claim 2 wherein said turbine head includes an axial shaft, the lower portion of said shaft carrying the plasticlike bearing member of the lower bearing arrangement, and the upper portion of said shaft carrying the socketed elastomeric seat member and the ceramiclike bearing element of the upper bearing arrangement, said elastomeric seat member being slidably disposed within the upper portion of said shaft, and spring means biasing said elastomeric member axially of said shaft to facilitate assembly and effect vibration-free assembly of said ventilator.

7. A turbine ventilator as defined in claim 1 wherein the spherically concave bearing surface of said plasticlike bearing element has a radius of curvature slightly larger than that of the corresponding bearing surface of said ceramiclike bearing element, whereby upon rotation of said ventilator head, the point of contact between said bearing elements will orbit about the surfaces thereof to provide a cleaning action for said surfaces.

8. A turbine ventilator as defined in claim 1 wherein said turbine head includes an axial shaft, the upper portion of said shaft carrying the socketed elastomeric seat member with the ceramiclike bearing element of said bearing arrangement, said elastomeric member being slidably disposed within said shaft, and spring means biasing said elastomeric member axially of said shaft to force said ceramiclike bearing element into engagement with said plasticlike bearing element.